F. SCHNEIBLE.
TIRE.
APPLICATION FILED AUG. 15, 1918.
1,334,970.
Patented Mar. 30, 1920.
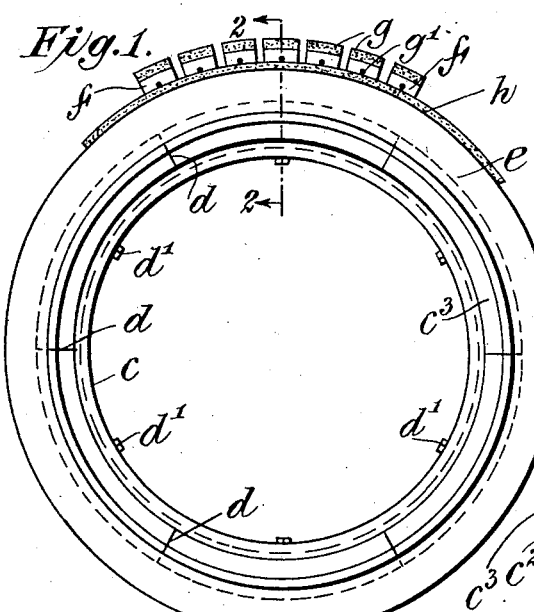
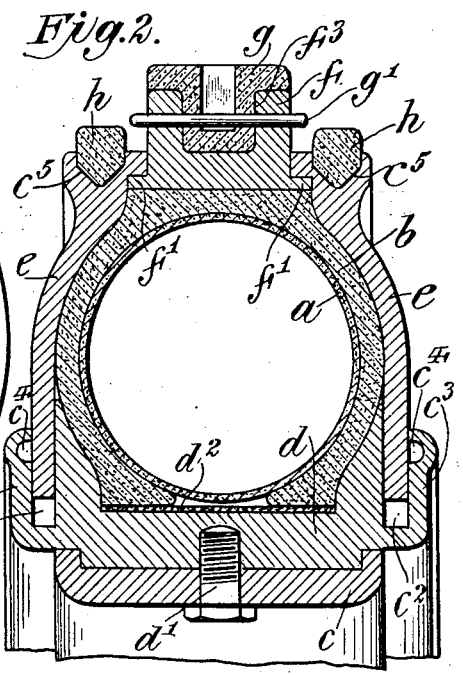
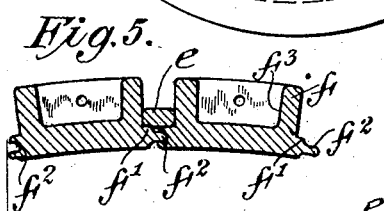
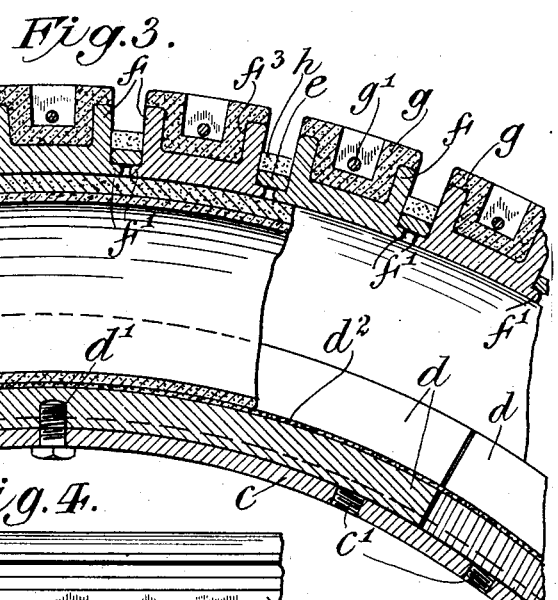
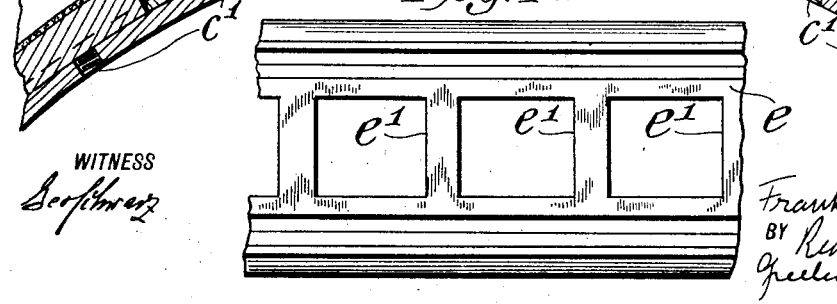
WITNESS
INVENTOR
Frank Schneible
BY Redding,
Greeley & Hollett
ATTORNEYS

UNITED STATES PATENT OFFICE.

FRANK SCHNEIBLE, OF NEW YORK, N. Y.

TIRE.

1,334,970.  Specification of Letters Patent.  Patented Mar. 30, 1920.

Application filed August 15, 1918. Serial No. 249,964.

*To all whom it may concern:*

Be it known that I, FRANK SCHNEIBLE, a citizen of the United States, residing in the borough of Manhattan of the city of New York, in the county of New York, in the State of New York, have invented certain new and useful Improvements in Tires, of which the following is a specification, reference being had to the accompanying drawing, forming a part hereof.

The object of this invention is to provide an improved metallic casing for a pneumatic tire which shall permit the complete tire to retain, practically to the same extent as a non-armored pneumatic tire, the desirable qualities of resilience and tractive effect while being practically non-puncturable and not liable to injury, either of the casing or of the tire shoe, from the working in of dust or mud or water. In accordance with the invention the pneumatic tire of fabricated rubber is received within a completely annular metallic casing which is interposed between the shoe of fabricated rubber and the ground and yields, practically without deformation, as the pneumatic tire is deformed at and near its lowest point; such completely annular casing is seated in a guide and support which retains the casing securely in position with respect to the wheel while permitting its bodily movement in a vertical plane as the wheel rotates and the pneumatic tire is deformed through pressure at and near the lowest point. Various features of improvements, calculated to increase the efficiency of the general structure, to increase its durability, and to meet various conditions of practical use will be referred to more particularly hereinafter. A suitable and practical embodiment of the invention is illustrated in the accompanying drawing in which—

Figure 1 is a view in side elevation, partly in longitudinal section, of a complete structure in which invention is embodied.

Fig. 2 is a view in section on the plane indicated by the broken line 2—2 of Fig. 1, looking in the direction of the arrows, but on a larger scale.

Fig. 3 is a view in longitudinal section.

Fig. 4 is a top view of the casing with the tread blocks removed.

Fig. 5 is a detail view in section showing particularly the inter-linking of the tread blocks, which is not shown in Fig. 3.

The pneumatic portion of the complete tire may be constructed substantially as usual, comprising an inner, inflatable tube $a$, and a shoe $b$ of fabricated rubber, the latter being constructed substantially as the ordinary fabricated tire shoes but modified slightly in cross section so that it may lend itself more readily to coöperation with the casing.

The complete structure also comprises a rim $c$ which corresponds substantially to the ordinary demountable rim, although modified slightly in form. It furnishes a means of attachment for the segments $d$ of the segmental casing guide and support, each segment being preferably secured to the rim $c$ by the bolt $d^1$ which passes freely through the rim $c$ and is threaded into the segment. The rim $c$ may also be provided with threaded holes $c^1$ into which the bolts $d^1$ may be screwed for the purpose of forcing the segments away from the rim when demounting the tire. Each segment is provided at each side with a rather deep circumferential groove $c^2$, the outer wall $c^3$ being also provided preferably with a groove $c^4$ in its inner face for the reception of a packing ring of suitable material to prevent the ingress of dust, etc. The grooves $c^2$, it will be understood, are parallel with the plane of rotation of the wheel and each is a continuous groove, the grooves of the several segments being alined. A flap $d^2$ of rubberized fabric or other suitable material may be provided, if desired, to cover the joints between adjacent segments. It will be observed that the rim $c$ is not only necessary to the support of the segments $d$ in proper relation but that it makes the armored tire readily demountable, it being possible with its use to carry the tire fully inflated, with its armor, in readiness for application to the wheel of the vehicle when desired.

The pneumatic tube and shoe are received in the space between the casing guide and support $d$ and the casing $e$ which, as shown in Fig. 2, is substantially U-shaped in cross section, its two side flanges being parallel with each other and with the plane of rotation of the wheel and spaced so as to enter and fit freely in the grooves $c^2$ of the casing guide and support $c$. In its circumferential or tread portion, the casing $e$ is formed with a series of openings $e^1$, preferably rectangular, as shown in Fig. 4, to receive the steel tread blocks $f$ which are inserted through the openings from the inner side and are flanged within the casing, as in $f^1$, so as to be retained within the casing, the flanges being preferably tongued and grooved, as clearly shown at $f^2$ in Fig. 5 so that adjacent tread blocks shall be interconnected and moved together as one or another is subjected to pressure. Each tread block is also recessed in its external face, as at $f^3$, to receive a resilient block $g$ of rubber or other suitable material. Such resilient block may be held in place by a transverse pin $g^1$, the ends of which are extended somewhat beyond the said walls of the steel tread block, so that when any tread block is subjected to excessive pressure, its movement toward the center of the wheel may be limited by contact of the ends of the pin $g^1$ with the circumferential surface of the casing $c$.

Preferably the tread or circumferential face of the annular casing is provided near each edge, with a groove $c^5$ for the reception of a ring $h$ of resilient material.

In assembling the improved structure the steel tread blocks $f$ are inserted in the openings $e^1$ of the shoe $e$ from within. The resilient blocks $g$ are put in place and are retained by insertion of the pins $g^1$. The fabricated rubber shoe $b$ with the partly inflated tube $a$, is then inserted in the case. The segments $d$ are then applied to the flanges of the casing and are pressed outwardly against the shoe until the casing, tube and segmental guide and support can be slipped upon the rim $c$. The segments are then secured to the rim $c$ by the bolts $d^1$ and tube $a$ is fully inflated. It will be observed that the grooves $c^2$ are of sufficient depth to permit the segments to be pressed outwardly as stated and also to move inwardly again, when the tube is inflated, until they are pressed firmly upon the rim $c$ and are in close contact with each other end to end.

It will be observed that the pneumatic tire shoe $b$ is entirely inclosed in metal and cannot be punctured in any ordinary manner, while at the same time the complete tire has the riding qualities of ordinary pneumatic tires. When the vehicle, equipped with such an armored tire, passes over an ordinary road surface the shocks are transmitted by the tread blocks $f$ to the pneumatic shoe $b$. Each block acts as an individual pneumatic shock absorber, but transmits the shock to a relatively greater area of the shoe $b$ by reason of the interconnection of adjacent blocks as described. As each block is pressed toward the center of the wheel by the weight of the vehicle it causes the pneumatic shoe to be deformed and it is returned to normal position as soon as it and the adjacent blocks are relieved of pressure. Should the weight or the shock be so great that it cannot be compensated for by the deformation of the pneumatic shoe, then the resilient tread rings $h$ may contact with the road surface, and if these are compressed the pressure may be transmitted through pins $g^1$ to the circumferential surface of the casing which may then yield bodily with the deformation of the pneumatic tube within. Should the pneumatic tube become deflated for any reason, the tire can still be used for a reasonable distance of travel because the weight will then be carried on the resilient tread rings $h$.

The shoe $b$ is firmly supported at all times and at all points, not only at the point of contact between the casing and the road surface, but throughout the circumference of the tire. All strains are therefore taken from the fabric of the shoe and all shocks are distributed over large areas instead of being confined to a very limited area. Punctures and blow-outs are practically impossible.

Various changes in details of construction and arrangement can be made to suit different conditions of use and the invention, therefore, is not limited to the particular construction shown and described herein except as pointed out in the claims.

I claim as my invention:

1. In combination, an annular metal tire casing having a series of openings in its circumferential tread face and tread blocks inserted in said openings from within and inter-locked one with another.

2. In combination, an annular metal tire casing having openings in its circumferential tread face, tread blocks inserted in said openings from within and means to limit the inward movement of the tread blocks.

3. In combination, an annular metal tire casing having openings in its circumferential tread face, tread blocks inserted in said openings from within, and pins passed through the tread blocks outside of the face of the casing and adapted to bear out their ends against the face of the casing to limit the inward movement of the tread blocks.

This specification signed this 8th day of August, A. D. 1918.

FRANK SCHNEIBLE.